Patented May 13, 1941

2,241,950

UNITED STATES PATENT OFFICE 2,241,950

LUMINESCENT MATERIAL

Magdalene Hüniger, Berlin-Charlottenburg, and Hans Panke, Berlin, Germany, assignors to General Electric Company, a corporation of New York No Drawing. Application December 20, 1939, Serial No. 310,254. In Germany March 2, 1938

6 Claims. (Cl. 250—81)

Our invention relates in general to luminescent materials or phosphors such as are used in gaseous discharge devices for the production of fluorescent light. More particularly, our invention relates to red luminescing materials and to a method of preparing the same. The present application is a continuation-in-part of our co-pending applications Serial Nos. 258,858 and 310,255, filed February 27, 1939, and December 20, 1939, respectively, and assigned to the assignee of the present application.

In the above-referred-to co-pending applications, methods have been described for the production of borate and phosphate luminous materials which luminesce in widely different colors. Among others, luminous materials are disclosed therein which luminesce with a red color. Accurate measurements, however, have shown that a part of the light emission of such red luminescing materials lies in the infra-red range of the spectrum, so that this energy is consequently lost as far as the emission of visible light is concerned.

One object of the present invention is to provide long-wave luminescing materials the luminescence of which is displaced towards the shorter wave lengths to thereby minimize the luminescence in the infra-red region of the spectrum.

Another object of our invention is to provide a method for displacing the luminescence of such long wave luminescing materials towards the shorter wave lengths.

Further objects and advantages of our invention will appear from the following description of species thereof.

As set forth in the above-mentioned co-pending applications, luminescent materials may be produced by activating one or more borates and/or phosphates of the alkali metals, the metals of the second group of the periodic system excepting mercury, and the metals of the third main group of the periodic system, by an addition of 0.05 to 30 mol per cent of one or more borates and/or phosphates of silver, thallium, tin, lead, cerium and antimony together with an addition of 0.05 to 40 mol per cent of manganese borate and/or phosphate. These luminescent materials or phosphors are produced by heating a mixture of the original materials which may be finely powdered or which may consist of coarse granules. For the original materials, one can use oxides, carbonates, oxalates, and similar salts, which are transformed into borates and phosphates by the addition of boric acid or phosphoric acid. One can also start with the finished borates or phosphates and may transform them into phosphors by mixing and heating. It is not necessary to fuse them together; a simple sintering will suffice. In many instances, however, it is advisable to melt the materials. After the melting, they can then be left to solidify into glassy or crystalline bodies. If the phosphors are to solidify in a glassy form, it is advisable to increase the addition of boric or phosphoric acid to such an extent that the oxide or acid content will exceed the acid content called for by the chemical formula of the metaborates or metaphosphates.

Of the various luminescent borates and phosphates referred to above, certain ones luminesce with a red color. Accurate measurements, however, have shown that a considerable portion of the light emission of such red luminescing materials falls within the infra-red region of the spectrum and is accordingly lost insofar as visible light is concerned.

According to the invention, the luminescence of such materials is displaced toward shorter wave-lengths by a substitution of silicic acid for a portion of the boric or phosphoric acid. The portion replaced by silicic acid does not have to be very large to obtain such a displacement of the luminescence. In particular, there is no need to replace more than 50 mol per cent of the boric or phosphoric acid by silicic acid. For instance, if in an aluminum phosphate which is activated with tin phosphate and manganese phosphate and which has a strong red luminescence, 25 mol per cent of the phosphoric acid component is replaced by silicic acid, then a luminescent material is obtained, presumably a compound or mixture of aluminum phosphate and silicate, whose emission is mainly orange. Similarly, if in a calcium phosphate which is activated with cerium and manganese phosphate and which has an intensively red luminescence, 25 mol per cent of the phosphoric acid component is replaced by silicic acid, then a luminescent material is obtained, presumably a compound or mixture of calcium phosphate and silicate, the luminescence of which will be in the color range from yellow to orange.

The luminescent materials can be produced by fritting.

What we claim as new and desire to secure by Letters Patent of the United States is:

1. The method of minimizing the infra-red luminescence of red-luminescing materials included within the group consisting of the borates and phosphates of the alkali metals and the metals of the second and third groups of the periodic system excepting mercury activated by one or more materials belonging to the group of compounds consisting of the borates and phosphates of silver, thallium, tin, lead, cerium and antimony and a material belonging to the group of compounds consisting of the borate and phosphate of manganese, which method consists in changing the stoichiometric formula composition of such materials by the substitution of silicic acid for up to 50 mol per cent of the acid component of said borate and phosphate luminescent materials.

2. The method of minimizing the infra-red luminescence of red-luminescing materials included within the group consisting of the borates and phosphates of the alkali metals and the metals of the second and third groups of the periodic system excepting mercury activated by 0.05 to 30 mol per cent of one or more materials belonging to the group of compounds consisting of the borates and phosphates of silver, thallium, tin, lead, cerium and antimony and 0.05 to 40 mol per cent of a material belonging to the group of compounds consisting of the borate and phosphate of manganese, which method consists in changing the stoichiometric formula composition of such materials by the substitution of silicic acid for up to 50 mol per cent of the acid component of said borate and phosphate luminescent materials.

3. The method of displacing towards shorter waves the light emitted by a red luminescing material of the group consisting of the borates and phosphates of the alkali metals and the metals of the second group and third main group of the periodic system excepting mercury, which comprises forming a luminescent material of the said group in which the total acid content consists of a combination of an acid of the group consisting of boric and phosphoric acids combined with silicic acid in an amount up to 50 mol per cent of the said acid of said group.

4. A luminescent material of the group consisting of the borates and phosphates of the alkali metals and the metals of the second group and third main group of the periodic system excepting mercury, in which silicic acid constitutes up to 50 mol per cent of the boric or phosphoric acid component of said material.

5. A luminescent material containing in chemical combination silica and a second material selected from the group consisting of the borates and phosphates of the alkali metals and the metals of the second group and third main group of the periodic system excepting mercury, activated by one or more of the metals selected from the group consisting of silver, thallium, tin, lead, cerium, antimony and manganese, the silica being present in an amount, calculated as silicic acid, constituting up to 50 mol per cent of the boric or phosphoric acid component of the luminescent material.

6. A luminescent material comprising a compound of the group consisting of the borate and phosphate of, in chemical combination with the silicate of, a metal included within the group consisting of the alkali metals and the metals of the second group and third main group of the periodic system excepting mercury, the amount of silicate in the said material being such that the silicic acid component present in the said material constitutes up to 50 mol per cent of the boric or phosphoric acid component of said material.

MAGDALENE HÜNIGER.
HANS PANKE.